Patented Feb. 20, 1923.

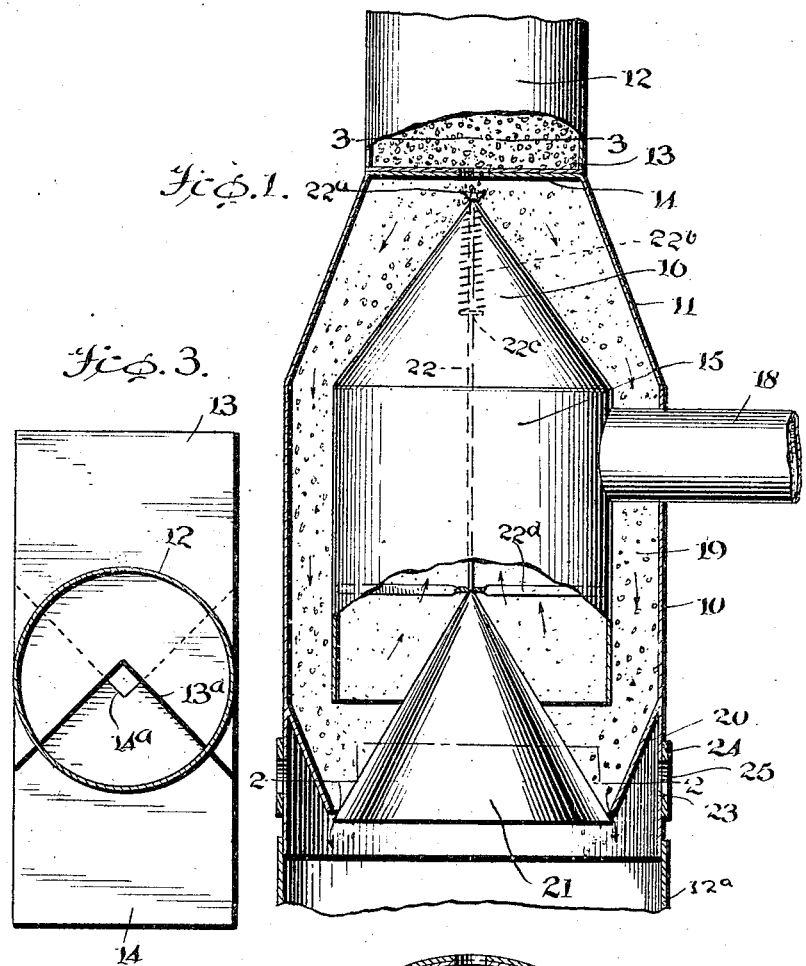
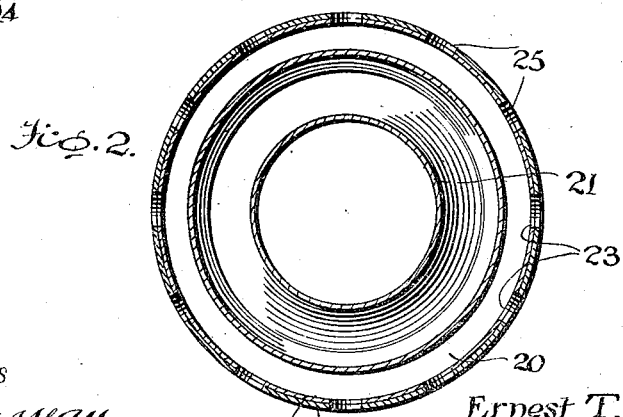

1,445,760

UNITED STATES PATENT OFFICE.

ERNEST T. DRAKE, OF FOSTORIA, OHIO.

VACUUM ASPIRATOR.

Application filed October 15, 1921. Serial No. 508,033.

*To all whom it may concern:*

Be it known that I, ERNEST T. DRAKE, a citizen of the United States, and a resident of Fostoria, in the county of Seneca and State of Ohio, have invented certain new and useful Improvements in Vacuum Aspirators, of which the following is a specification.

My invention relates to an improved vacuum aspirator for grain.

The object of the invention is to provide an improved vacuum aspirator of this character which is especially adapted for use in the handling and manufacturing and for aspirating and purifying grain, such as wheat, corn, rye, oats, barley and grain by-products, and which is of simple and durable construction, reliable in operation and easy and inexpensive to manufacture.

Other objects and advantages reside in certain novel features of the construction, arrangement and combination of parts which will be hereinafter more fully described and particularly pointed out in the appended claims, reference being had to the accompanying drawings, forming a part of this specification, in which, Figure 1 is a view partly in side elevation and partly in transverse, vertical section of the first embodiment of the invention, Figure 2 is a transverse, vertical, sectional view on the line 2—2 of Figure 1, and Figure 3 is a similar view on the line 3—3 of Figure 1.

Referring to the drawings wherein, for the sake of illustration, is shown the preferred embodiment of the invention, the numeral 10 designates an outer cylinder or casing constructed of iron or other suitable material. The upper end of the cylinder is constructed as at 11 and is connected to a delivery conduit 12 for the grain or the like.

The lower end of the cylinder 10 is connected to the outlet conduit 12ª for the grain and in this manner the cylinder 10 is closed as to ingress of air except in respect of the openings 23 to be hereinafter fully described.

Means is provided for controlling the admission of grain into the cylinder 10 from the delivery conduit 12 and consists of complementary plates designated at 13 and 14 (see Figure 3) which slidably overlap and which have their adjacent ends provided with V-shaped notches 13ª and 14ª respectively. It is obvious that the plates may be slidably adjusted to entirely overlap each other and close the passage from the delivery conduit to the cylinder or that they may be adjusted so that their notched ends alone overlap to the desired degree. When the notched ends only overlap, the V-shaped notches thereof define the inlet opening into the cylinder as more clearly indicated in Figure 3.

It is to be understood that any type of feed controlling means known to those skilled in the art may be utilized for controlling communication between the delivery conduit 12 and the outer cylinder 10 and that the details of the construction of the feed controlling means hereinabove described forms no essential part of the invention claimed in this application.

An inner cylinder 15 is axially arranged within the outer cylinder or casing 10 and is closed at its top by an imperforate conical head 16 which may be integrally formed with the cylinder 15. The lower end of the cylinder is open as shown in Figure 1. The arrangement is such that the apex of the conical head is disposed immediate to and axially alined with the inlet opening defined by the notches of the plates irrespective of the adjustment thereof.

A suction pipe 18 extends through a suitable opening therefor in the casing 10 and communicates at its inner end with the inner cylinder 15. The suction pipe 18 leads to any suitable means for creating a suction such, for instance, as any conventional suction fan, exhaust pump or the like.

The inner cylinder and the outer cylinder define an annular passage 19 for the grain and at the lower end of this annular passage a circular deflector 20 of inverted frusto-conical form is arranged and is suitably supported upon the inner wall of the outer cylinder 10. A combined deflector valve 21 of conical form is axially arranged within the deflector 20 and has its base adjustable toward and away from the lower end of the deflector 20 and its apex disposed well up within the inner casing 15. Adjusting means is provided for the combined deflector valve 21 and preferably comprises an adjusting rod 22 secured to the apex of the valve 21 and adjustably supported on the apex of the inner cylinder by a wing nut 22$^a$ threaded on the upper end of the rod 22 and abutting the apex of the conical head 16 of the inner cylinder 15. A coil spring 22$^b$ is mounted on the rod 22 and abuts the under side of the apex of the conical head 15 at its upper end and at its lower end a collar or washer 22$^c$ fixed to the rod 22. Guiding means is provided for the rod and deflector and consists of a spider comprising a plurality of spider arms 22$^d$ consisting of flat pieces of metal secured to the rod at their centers and slidably abutting the inner surface of the inner cylinder 15 at their ends, the arms 22 being twisted adjacent their center or hub so as to present their edges to the substance in the cylinder for the greater part of their length.

The outer casing or cylinder 10 is provided with a circumferential series of air inlet openings or vents 23, the centers of which lie in a plane well up behind the inverted frusto-conical deflectors 20. An annular valve 24 is mounted on the cylinder and is provided with a corresponding series of openings or vents 25. It is obvious that by rotatably adjusting the annular valve 24 the series of openings 25 thereof may be brought into and out of register with the series of openings 23 of the casing to thereby regulate the inlet of air through these openings.

In operation, the grain is admitted in suitable quantities into the cylinder 10 by adjustment of the complementary plates 13 and 14. As it enters through the inlet opening defined by the notches of these complementary plates it encounters the conical head of the inner cylinder and by means of this head and the contracted upper end 11 of the cylinder 10 it is uniformly distributed so that in the annular space 19 it is formed into an annular column. As this column descends it strikes the inverted frusto-conical deflector 20 and is deflected inwardly thereby. At this time the suction operating through the pipe 18 is effective to induce an upflow of air through the lower end of the outer cylinder and around the conical deflector 21 into and up through the inner cylinder 15 to the suction pipe 18. It is important to note, however, that the air is admitted only through the openings 23, the valve 24 being adjusted for this purpose and that it enters horizontally and is constrained by the deflector 20 to flow downwardly around this deflector and then upwardly between this deflector 20 and the conical deflector 21. As it flows around the lower end of the deflector 20 it encounters the grain and from then on its upflow is through the grain. All of the grain which passes through must travel between the deflectors 20 and 21 and thus all of the grain is treated with the result that all of the grain is thoroughly aspirated and purified.

I claim:—

1. In a device of the character described, an outer cylinder, a delivery conduit connected to the upper end, means for controlling communication between the delivery conduit and the outer cylinder, an inner cylinder axially arranged within the outer cylinder and having a conical head, a suction pipe extending through the outer cylinder and communicating at its inner end with the interior of the inner cylinder, an inverted frusto-conical deflector carried by the inner wall of the outer cylinder adjacent the lower end of the inner cylinder, a conical deflector spaced from and arranged within the frusto-conical deflector and having its base coincident with the lower end of the frusto-conical deflector and its apex disposed within the inner cylinder, said outer cylinder having a circular series of air inlet openings around said frusto-conical deflector and a valve carried by the outer cylinder for controlling said air inlet openings.

2. In a device of the character described, an outer cylinder, an inner cylinder arranged within said outer cylinder, a suction pipe leading from said outer cylinder and communicating at its inner end with the inner cylinder, an inverted frusto-conical deflector carried by the outer cylinder, said outer cylinder having air openings around said frusto-conical deflector and a cooperating conical deflector carried by said frusto-conical deflector.

3. In a device of the character described, an outer cylinder, an inner cylinder arranged within the outer cylinder and having its upper end closed and its lower end open and defining with the outer cylinder a passage therethrough, means for controlling the inlet to said passage, means for creating a suction in said inner cylinder, a variable air inlet arranged at the lower end of said outer cylinder and deflectors arranged adjacent said air inlet and the lower end of said inner cylinder.

4. In a device of the character described, an outer cylinder, an inner cylinder arranged within said outer cylinder, a suction pipe leading from said outer cylinder and communicating at its inner end with said inner cylinder and an inverted frusto-conical deflector carried by said outer cylinder, and a combined deflector and valve cooperating with said frusto-conical deflector.

5. In a device of the character described, an outer cylinder, an inner cylinder arranged within said outer cylinder, an inverted frusto-conical deflector carried by said outer cylinder, a combined deflector and valve cooperating with said frusto-conical deflector, and adjusting means for said deflector and valve including an adjusting rod, a wing nut supported on said inner cylinder and threadedly connected with said adjusting rod, a coil spring mounted on said rod, and guiding means for said rod including a spider having its arms slidably abutting the inner cylinder.

ERNEST T. DRAKE.